US009855936B2

(12) United States Patent
Bousamra et al.

(10) Patent No.: US 9,855,936 B2
(45) Date of Patent: Jan. 2, 2018

(54) SYSTEM AND METHOD TO IMPROVE ENGAGEMENT SHIFT QUALITY IN AUTOMATIC TRANSMISSIONS USING ENGAGEMENT BRAKE TORQUE CONTROL

(71) Applicant: FORD GLOBAL TECHNOLOGIES, LLC, Dearborn, MI (US)

(72) Inventors: Joseph Bousamra, Commerce Township, MI (US); Charles William Suter, South Lyon, MI (US); Thaddeus Hill, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/924,953

(22) Filed: Oct. 28, 2015

(65) Prior Publication Data
US 2017/0120880 A1   May 4, 2017

(51) Int. Cl.
*B60T 8/1755* (2006.01)
*B60T 8/17* (2006.01)
*F16H 63/40* (2006.01)
*B60T 8/24* (2006.01)
*B60T 8/32* (2006.01)
*B60T 8/52* (2006.01)

(52) U.S. Cl.
CPC .............. *B60T 8/17* (2013.01); *B60T 8/245* (2013.01); *B60T 8/3205* (2013.01); *B60T 8/52* (2013.01); *F16H 63/40* (2013.01); *B60T 2201/06* (2013.01)

(58) Field of Classification Search
USPC ........... 701/51, 53; 477/92, 184, 203, 45, 46
See application file for complete search history.

(56) References Cited

U.S. PATENT DOCUMENTS

| 4,454,936 | A | * | 6/1984 | Wise | B60T 11/103 |
| | | | | | 192/219.7 |
| 4,747,643 | A | * | 5/1988 | Lanzer | B60T 8/26 |
| | | | | | 180/233 |
| 4,917,224 | A | * | 4/1990 | Gokee | F16C 1/12 |
| | | | | | 180/271 |
| 6,090,010 | A | * | 7/2000 | Rose | B60T 10/02 |
| | | | | | 477/92 |
| 6,126,251 | A | | 10/2000 | Yoshii et al. | |
| 6,183,393 | B1 | | 2/2001 | Habeck | |
| 6,241,068 | B1 | * | 6/2001 | Meyer | F16H 59/10 |
| | | | | | 192/220.4 |
| 6,490,516 | B1 | * | 12/2002 | Henneken | B60K 28/165 |
| | | | | | 477/45 |

(Continued)

FOREIGN PATENT DOCUMENTS

| JP | 2009154865 A | 7/2009 |
| KR | 100569356 B1 | 4/2006 |
| WO | 2011056132 A1 | 5/2011 |

*Primary Examiner* — Richard Goldman
(74) *Attorney, Agent, or Firm* — James Dottavio; Brooks Kushman P.C.

(57) ABSTRACT

A method of controlling a vehicle includes, in response to vehicle speed being approximately zero and a driver braking torque request being greater than a park interlock threshold, commanding vehicle brakes to provide an augmented braking torque. The augmented braking torque has a magnitude that is greater than the magnitude of the braking torque request. The braking torque returns to the level of the driver braking torque request following completion of a gear shift event.

19 Claims, 3 Drawing Sheets

(56) References Cited

U.S. PATENT DOCUMENTS

| | | | | |
|---|---|---|---|---|
| 6,615,127 | B2* | 9/2003 | Hellmann | B60K 31/0008 180/170 |
| 6,805,211 | B2* | 10/2004 | Fujikawa | B60K 6/383 180/65.25 |
| 8,882,636 | B2* | 11/2014 | Pietron | B60W 10/02 477/176 |
| 2005/0182532 | A1* | 8/2005 | Tobler | B60K 6/48 701/22 |
| 2006/0142919 | A1* | 6/2006 | Steinborn | F16H 61/0403 701/51 |
| 2007/0225117 | A1* | 9/2007 | Shimizu | B60T 7/12 477/182 |
| 2007/0282502 | A1* | 12/2007 | Bayer | B60W 10/04 701/42 |
| 2009/0118887 | A1* | 5/2009 | Minarcin | B60K 6/365 701/22 |
| 2010/0138124 | A1* | 6/2010 | Mallet | B60T 7/122 701/70 |
| 2011/0196587 | A1* | 8/2011 | Arnell | F02B 41/10 701/60 |
| 2012/0029787 | A1* | 2/2012 | Whitney | F02D 13/0207 701/102 |
| 2012/0197508 | A1* | 8/2012 | Seaman | F02D 37/02 701/102 |
| 2012/0330522 | A1* | 12/2012 | Gibson | B60W 10/06 701/70 |
| 2013/0013151 | A1* | 1/2013 | Schafiyha | B60T 8/17555 701/41 |
| 2013/0072348 | A1* | 3/2013 | Lochocki, Jr. | B60W 10/06 477/54 |
| 2013/0151092 | A1* | 6/2013 | Spaulding | F16H 59/0217 701/55 |
| 2013/0296100 | A1 | 11/2013 | Nefcy et al. | |
| 2014/0100758 | A1* | 4/2014 | Glugla | F02D 41/123 701/103 |
| 2014/0330466 | A1* | 11/2014 | Bureau | B60K 6/48 701/22 |
| 2015/0021140 | A1* | 1/2015 | Cunningham | B60T 13/46 192/219.1 |
| 2015/0065299 | A1* | 3/2015 | Goodrich | B60T 8/322 477/203 |
| 2015/0158492 | A1* | 6/2015 | Bulgrien | B60W 10/02 701/53 |
| 2015/0375731 | A1* | 12/2015 | Grover, Jr. | B60W 10/18 701/70 |
| 2016/0101766 | A1* | 4/2016 | Hu | B60T 7/122 701/70 |

* cited by examiner

SYSTEM AND METHOD TO IMPROVE ENGAGEMENT SHIFT QUALITY IN AUTOMATIC TRANSMISSIONS USING ENGAGEMENT BRAKE TORQUE CONTROL

TECHNICAL FIELD

This disclosure relates to the field of braking controls for vehicles, and more particularly to coordinating braking controls with operation of a vehicle transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Generally, transmissions include at least one negative speed ratio which is engaged when the driver selects reverse.

The driver controls the transmission mode by manipulating a range selector. Range selectors typically provide PARK, REVERSE, NEUTRAL, and DRIVE modes. In PARK mode, the vehicle is held stationary even in the presence of substantial force. This is conventionally implemented by placing the transmission gearbox in a neutral state and holding the output shaft stationary with a parking pawl. In REVERSE, the vehicle moves backward when the driver presses the accelerator pedal. In NEUTRAL, pressing the accelerator pedal does not cause the vehicle to move although the vehicle is allowed to move in response to other forces such as gravity. Finally, in DRIVE, the vehicle moves forward when the driver presses the accelerator pedal. REVERSE, NEUTRAL, and DRIVE are conventionally implemented by placing the gearbox in a corresponding state with the parking pawl released.

The transmission has a number of gear sets with gear teeth that are engaged when the vehicle operator selects a particular shift position. Typically, there is a gear lash, or play, between the gear teeth. As such, in some cases, when the operator shifts from the DRIVE shift position to the REVERSE shift position or the REVERSE shift position to the DRIVE shift position, the meshing gear teeth, due to the gear lash, may cause noise, vibration, and harshness (NVH) concerns as the gear teeth strike each other. Ultimately, this may result in an objectionable "clunking" sound and tactile disturbances.

SUMMARY

A system and method according to the present disclosure include a vehicle having a braking system configured to provide braking torque to traction wheels and a transmission configured to operate according to a plurality of transmission modes. In response to vehicle speed being less than a speed threshold and a driver braking request being less than a park interlock threshold, the braking system is commanded to apply a first braking torque to the traction wheel. The first braking torque is based on the driver braking request. In response to vehicle speed being less than the speed threshold and the driver braking request exceeding the park interlock threshold, the braking system is commanded to apply a second braking torque to the traction wheel. The second braking torque has a magnitude exceeding the driver braking request. In response to the transmission completing a shift from a first mode to a second mode with the second braking torque applied, the braking system is commanded to apply a third braking torque to the traction wheel. The third braking torque is based on the driver braking request.

According to a first embodiment, the second braking torque magnitude is based on the first mode of the transmission.

According to a second embodiment, the second braking torque magnitude is determined based on a drive shaft torque, a transmission clutch torque, and a calibratable torque margin.

According to a third embodiment, commanding the braking system to apply a third braking torque includes reducing braking torque from the second braking torque to the third braking torque at a calibratable rate. The calibratable rate is based on the second mode of the transmission.

A vehicle according to the present disclosure includes a traction wheel, a braking system configured to provide braking torque to the traction wheel, and a controller. The controller is configured to, in response to vehicle speed being less than a threshold and a driver braking torque request being greater than a park interlock threshold, command the braking system to provide an augmented braking torque to the traction wheel. The augmented braking torque is greater than the braking torque request.

According to a first embodiment, the vehicle further includes a gear shifter, and the augmented braking torque is based on the gear shifter position.

According to a second embodiment, the controller is further configured to, in response to a transmission gear shift being completed, command the braking system to provide a braking torque based on the braking torque request. In some embodiments, the controller is further configured to command the braking system to reduce braking torque from the augmented braking torque to the braking torque based on the braking torque request at a calibratable rate based on the gear shifter position.

According to a third embodiment, the controller is further configured to, in response to a detected road grade exceeding a calibratable threshold, command the braking system to provide an augmented braking torque corresponding to the greater of a calibratable value based on a gear shifter position and a braking torque to hold the vehicle stationary at the detected road grade.

A method of controlling a vehicle according to the present disclosure includes, in response to vehicle speed being less than a speed threshold and a driver braking torque request being greater than a park interlock threshold, commanding vehicle brakes to provide an augmented braking torque. The augmented braking torque has a magnitude that is greater than the magnitude of the braking torque request.

According to a first embodiment, the augmented braking torque is based on a gear shifter position.

According to a second embodiment, the augmented braking torque is determined based on a drive shaft torque, a transmission clutch torque, and a calibratable torque margin.

According to a third embodiment, the method additionally includes, in response to a transmission gear shift being completed, commanding the vehicle brakes to provide a braking torque based on the braking torque request. In some embodiments, commanding the vehicle brakes to provide a braking torque based on the braking torque request includes commanding the vehicle brakes to reduce braking torque from the augmented braking torque to the braking torque based on the braking torque request at a calibratable rate. The calibratable rate may be based on a gear shifter position. In some embodiments, commanding the vehicle brakes to provide a braking torque based on the braking torque request is in further response to the vehicle being stationary.

According to a fourth embodiment, when a detected road grade exceeds a calibratable threshold, the augmented braking torque corresponds to the greater of a calibratable value based on a gear shifter position and a braking torque to hold the vehicle stationary at the detected road grade.

According to a fifth embodiment, in response to an acceleration request and the vehicle brakes providing the augmented braking torque, the vehicle brakes are commanded to reduce braking torque at a calibratable rate.

Embodiments according to the present disclosure provide a number of advantages. For example, systems and methods according to the present disclosure may avoid NVH and other undesirable sensations during shifting, thus increasing operator satisfaction. Furthermore, systems and methods according to the present disclosure may provide this advantage without requiring intervention by the vehicle operator.

The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
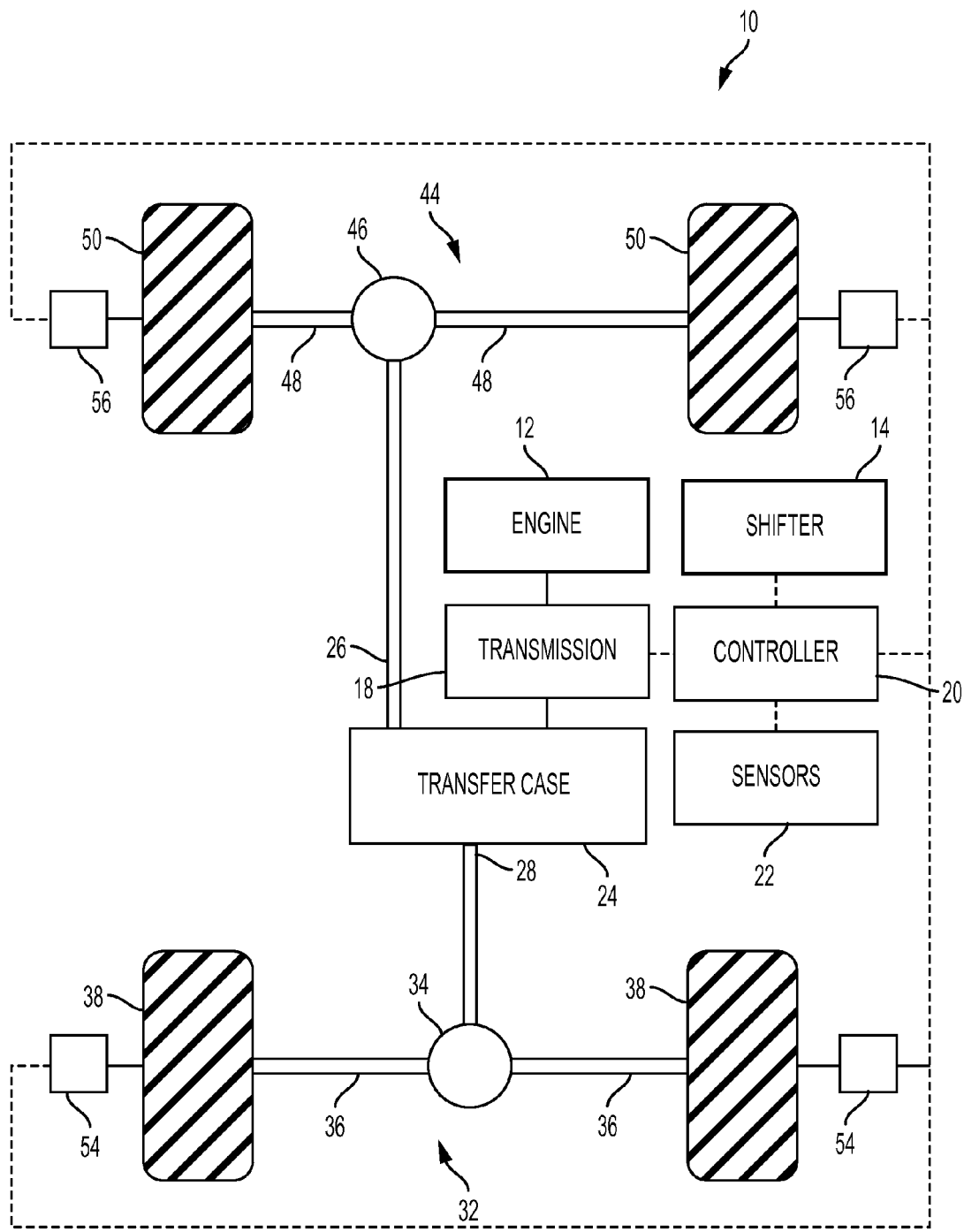
FIG. 1 is a schematic view of a representative vehicle according to an embodiment of the present disclosure.

Referring now to FIG. 1, a vehicle 10 according to the present disclosure is shown in schematic form. The vehicle 10 is a conventionally-powered (i.e. non-hybrid) vehicle including an internal combustion engine 12. It should be noted that embodiments having hybrid powertrains, e.g. with a second power source including an electric machine, are contemplated within the scope of the present invention. Furthermore, as will be discussed below, the vehicle 10 has a 4-wheel drive (4WD) configuration. However, rear-wheel-drive, front-wheel-drive, and selectable-drive-mode vehicles are also contemplated within the scope of the present invention.

The vehicle 10 additionally includes an automatic transmission 18. The transmission 18 includes multiple gearing elements and is configured to automatically engage or disengage shiftable elements, such as clutches, to shift between various gear ratios according to a shift schedule. A driver-actuated gear shifter or range selector 14 may be used by an operator to select a transmission operating mode for the transmission 18 among PARK, REVERSE, NEUTRAL, and DRIVE modes.

The engine 12, shifter 14, and transmission 18 are all in communication with or under the control of at least one controller 20. In addition, a plurality of sensors 22 are in communication with or under the control of the controller 20. The sensors 22 include, but are not limited to, a speedometer, a grade sensor, a brake pedal sensor configured to detect a position of a driver-actuated brake pedal, and an accelerator pedal sensor configured to detect a position of a driver-actuated accelerator pedal.

While depicted as a single unit, the controller 20 may include a plurality of distinct control modules that may be used to control multiple vehicle systems according to an overall vehicle control logic, or software. The controller 20 may include an engine control module (ECM), a transmission control module (TCM), a vehicle system controller (VSC), a brake controller, and/or other appropriate controllers. The controller 20 may include predetermined data, or "look up tables" that are based on calculations and test data and stored within the memory. The control modules of controller 20 communicate with each other and other vehicle systems over one or more wired or wireless vehicle connections using common bus protocols.

The vehicle 10 is arranged as 4WD platform. The transmission 18 drivingly couples the engine 12 to a transfer case 24. The transfer case 24 is configured to distribute torque between a front output shaft 26 and a rear output shaft 28. The rear output shaft 28 is drivingly coupled to a rear axle 32 via a rear differential 34. The rear axle 32 includes two half-shafts or side-shafts 36, each coupled to a respective rear traction wheel 38. The front output shaft 26 is drivingly coupled to a front axle 44 via a front differential 46. The front axle 44 includes two half-shafts or side-shafts 48, each coupled to a respective front traction wheel 50. Here, traction wheel refers to a driven or non-driven wheel in contact with a driving surface.

The vehicle 10 additionally includes rear friction brakes 54 configured to apply friction braking torque to the rear traction wheels 38 and front friction brakes 56 configured to apply friction braking torque to the front traction wheels 50. The rear friction brakes 54 and front friction brakes 56 are in communication with or under the control of the controller 20. In response to a braking request, as detected, for example, by a brake pedal sensor 22, the controller 20 is configured to coordinate the rear friction brakes 54 and front friction brakes 56 to provide friction braking torque to satisfy the braking request.

When an operator shifts the transmission from one mode of operation to another, e.g. from REVERSE to DRIVE, the meshing gear teeth, due to the gear lash, may cause NVH as the gear teeth strike each other. As a transmission shift occurs, the various geared components such as the transmission, differential, and Constant Velocity (CV) joints experience an abrupt change in the direction of rotation. This change is due, in part, to a sudden change in the direction of applied creep torque. Creep torque refers to the relatively small amount of wheel torque applied in the direction of a selected shift position, and may provide vehicle mobility without actuation of the vehicle accelerator pedal. The resulting noise and vibration may reduce customer satisfaction. The NVH effects may be reduced by increasing braking torque greater than that required to maintain the vehicle in a stationary position. An operator may manually mitigate the NVH by applying heavy braking prior to and during a shift. However, this may be an unsatisfactory solution because it requires that an operator be aware of the potential for NVH and proactively apply heavy braking.

Figure 2:
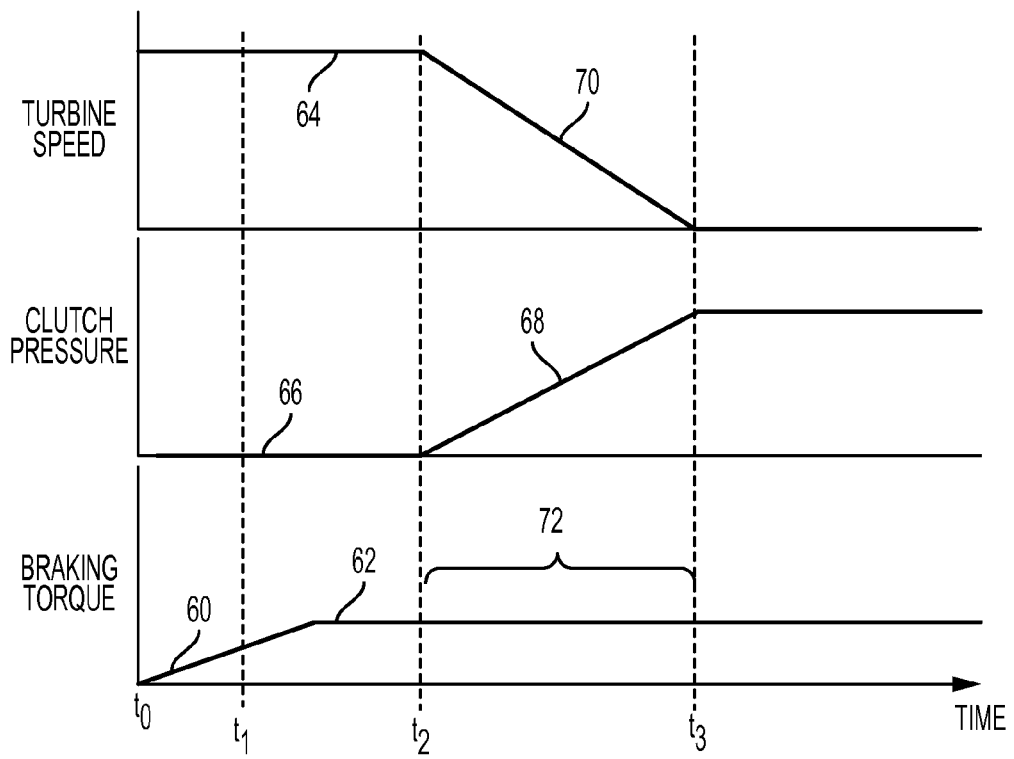
FIG. 2 illustrates turbine speed, transmission clutch pressure, and braking torque during a prior art gear shift event.

Referring now to FIG. 2, a plot is shown of transmission turbine speed, transmission clutch pressure, and braking torque during a typical shift from PARK to DRIVE in using known methods and vehicles. At time to, the vehicle is stationary with the engine running and the transmission in PARK. The vehicle braking torque is increased, as indicated at numeral 60, and then held generally constant, as shown at numeral 62. At time $t_1$, the braking torque magnitude exceeds a park interlock threshold to enable the transmission to be shifted out of PARK. The braking torque magnitude corresponds to a driver braking request, e.g. based on an actuation of a brake pedal. Here, the braking torque 62 is a relatively low magnitude torque, e.g. higher than the park interlock threshold but only marginally higher than the creep torque provided when the transmission is shifted into gear.

With the transmission in PARK, the turbine speed, i.e. the input speed to the transmission, is a non-zero value, e.g. the engine idle speed, as shown at 64. Meanwhile, the clutch pressure of a transmission clutch is approximately zero, i.e. disengaged, as shown at 66.

At time $t_2$, a shift request is received to shift the transmission from PARK to DRIVE, e.g. in response to a driver movement of a gear shifter. To shift the transmission from PARK to DRIVE, the clutch pressure is increased to drivingly couple gearing elements of the transmission, as shown at 68. The clutch pressure is increased over the time interval from $t_2$ (disengaged) to $t_3$ (fully engaged). As the clutch pressure increases, the turbine speed decreases, as shown at 70. At time $t_2$, the clutch is fully engaged, and the turbine speed has reduced to zero due to the vehicle being stationary. While depicted as linear over time, the clutch pressure may be increased in a nonlinear fashion, and the decrease in turbine speed may be similarly nonlinear.

During the time interval between $t_2$ and $t_3$, NVH may arise due to the relatively sudden change in speed and torque of the various geared components of the drivetrain. The relatively low magnitude braking torque during this time interval, indicated at numeral 72, may be insufficient to mitigate the NVH effect.

Figure 3:
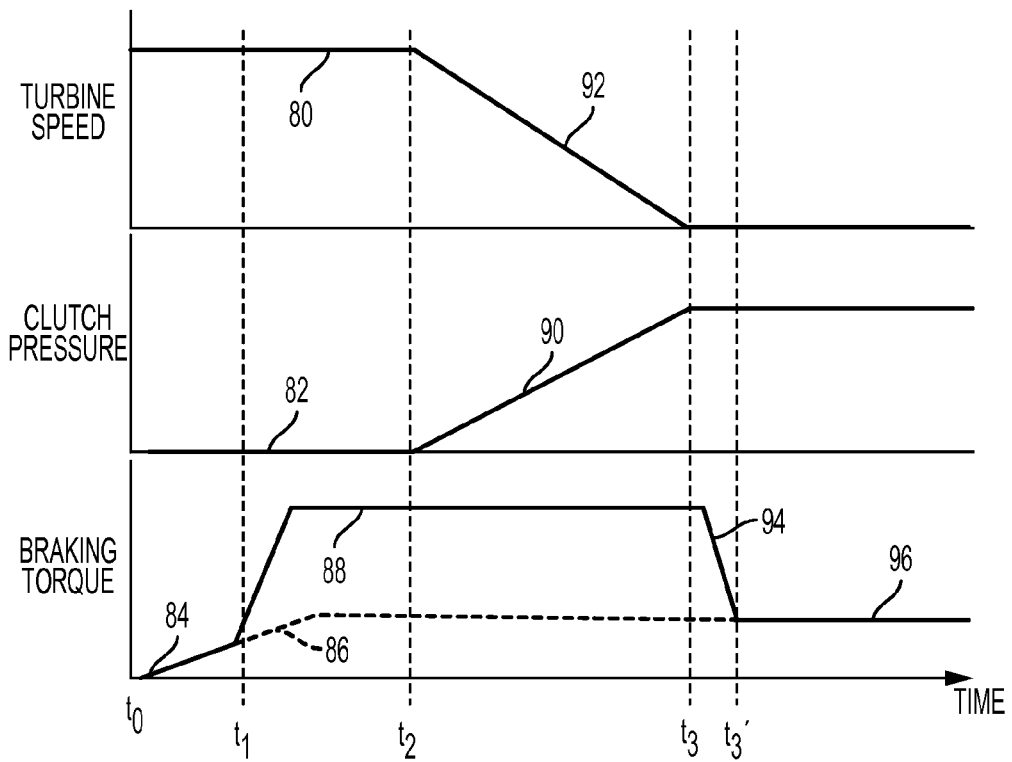
FIG. 3 illustrates turbine speed, transmission clutch pressure, and braking torque during a gear shift event according to the present disclosure.

Referring now to FIG. 3, a plot is shown of turbine speed, transmission clutch pressure, and braking torque during a shift from PARK to DRIVE according to the present disclosure. At time $t_0$, the vehicle is stationary with the engine running and the transmission in PARK. The turbine speed is a non-zero value, as shown at 80, and the transmission clutch pressure is approximately zero, as shown at 82. The vehicle braking torque is increased, as indicated at numeral 84, based on a driver braking torque request. At time $t_1$, the magnitude of the braking torque request exceeds the park interlock threshold. The driver braking torque request increases to a relatively low magnitude and then remains generally constant, as shown at numeral 86.

In response to the driver braking torque request exceeding the park interlock threshold, an augmented braking torque is applied, as shown at numeral 88. The augmented braking torque is greater than the driver braking torque request and has a relatively high magnitude. The braking torque is increased from the driver braking torque request to the augmented braking torque at a calibratable rate, which may be referred to as a "ramp-up rate".

At time $t_2$, a shift request is received to shift the transmission from PARK to DRIVE. To shift the transmission from PARK to DRIVE, the clutch pressure is increased to drivingly couple gearing elements of the transmission, as shown at 90. The clutch pressure is increased over the time interval from $t_2$ (disengaged) to $t_3$ (fully engaged). As the clutch pressure increases, the turbine speed decreases, as shown at 92. At time $t_2$, the clutch is fully engaged, and the turbine speed has reduced to zero due to the vehicle being stationary.

During the time interval between $t_2$ and $t_3$, the relatively high magnitude of the augmented braking torque may be sufficient to substantially reduce the NVH associated with the change in speed and torque of the various geared components of the drivetrain.

At time $t_3$, the transmission clutch is fully engaged and the shift from PARK to DRIVE is complete. In response, the braking torque is reduced from the augmented braking torque to a magnitude based on the driver braking torque request, as shown at 94. In a preferred embodiment, the braking torque is reduced only upon satisfaction of a determination that the vehicle is stationary. In a further preferred embodiment, the braking torque is reduced from the augmented braking torque to the magnitude based on the driver braking torque request at a calibratable rate, which may be referred to as a "ramp-down rate". At time $t_3'$, the braking torque has reduced to a magnitude corresponding to the driver braking torque request, as shown at 96.

In one embodiment, the magnitude of the augmented braking torque may be calculated on-board the vehicle, e.g. as a function of transmission input torque, transmission output torque, clutch torque, and a calibratable torque margin. The augmented braking torque magnitude may also be based on other parameters, including but not limited to engine speed and calculated wheel torque.

In another embodiment, the magnitude of the augmented braking torque may be a pre-calibrated value based on the vehicle configuration. In such an embodiment, the augmented braking torque may be stored in vehicle memory, e.g. in a lookup table.

While the example illustrated in FIG. 3 is based on a shift from PARK to DRIVE, an augmented braking torque may similarly be implemented in conjunction with other shifts, including any shift between PARK, DRIVE, NEUTRAL, and REVERSE modes.

In one embodiment, the transition from driver braking torque request to augmented braking torque and back is customized based on the type of shift. For example, a lookup table may be provided with a first ramp-up rate and/or a first augmented braking torque magnitude associated with shifts that begin in PARK, a second ramp-up rate and/or a second augmented braking torque magnitude associated with shifts that begin in DRIVE, a third ramp-up rate and/or a third augmented braking torque magnitude associated with shifts that begin in NEUTRAL, and a fourth ramp-up rate and/or a fourth augmented braking torque magnitude associated with shifts that begin in REVERSE. Similarly, the lookup table may include a first ramp-down rate associated with shifts that end in PARK, a second ramp-down rate associated with shifts that end in DRIVE, a third ramp-down rate associated with shifts that end in NEUTRAL, and a fourth ramp-down rate associated with shifts that end in REVERSE.

In another embodiment, the transition from driver braking torque to augmented braking torque and back is customized based on vehicle speed. For example, a lookup table may be provided with a first ramp-up rate, ramp-down rate, and/or first augmented braking torque magnitude associated with shifts that begin with the vehicle fully stationary, and a second ramp-up rate, ramp-down rate, and/or second augmented braking torque magnitude associated with shifts that begin with the vehicle rolling at a low velocity. In this fashion, a driver who shifts from DRIVE to REVERSE while the vehicle is still rolling may not be surprised by the sudden application of the augmented braking torque. Most preferably, the augmented braking torque is only applied when vehicle speed is less than a calibratable speed threshold. As a non-limiting example, the speed threshold may be approximately five miles per hour.

In an additional embodiment, the augmented braking torque magnitude is varied during a shift from a first transmission mode to a second transmission mode. As an example, in some vehicle configurations, NVH may be more likely to occur near the beginning of the shift. In such configurations, the augmented braking torque may be optimized to have a higher magnitude during the corresponding beginning portion of the transmission shift. In such embodiments, the magnitude of the augmented braking torque may be varied based on transmission clutch pressure.

In yet another embodiment, the host vehicle may be additionally provided with a so-called hill start assist system. A hill start assist system is configured to, in response to the transmission being shifted into DRIVE, a current road grade exceeding a calibratable threshold, and a brake pedal being released, continue applying a braking torque adequate to prevent vehicle rollback. The braking torque is applied for a calibratable time interval. In such embodiments, the magnitude of the augmented braking torque applied during the shift is set equal to the greater of the augmented braking torque as discussed above and the braking torque applied by the hill start assist system.

In a further embodiment, the augmented braking torque is discontinued in response to an acceleration request, e.g. a driver actuation of an accelerator pedal or an automated request for acceleration in a self-driving vehicle. In this fashion, a driver who applies the accelerator pedal before the shift has completed may not be surprised by the heavy application of braking torque.

Figure 4:
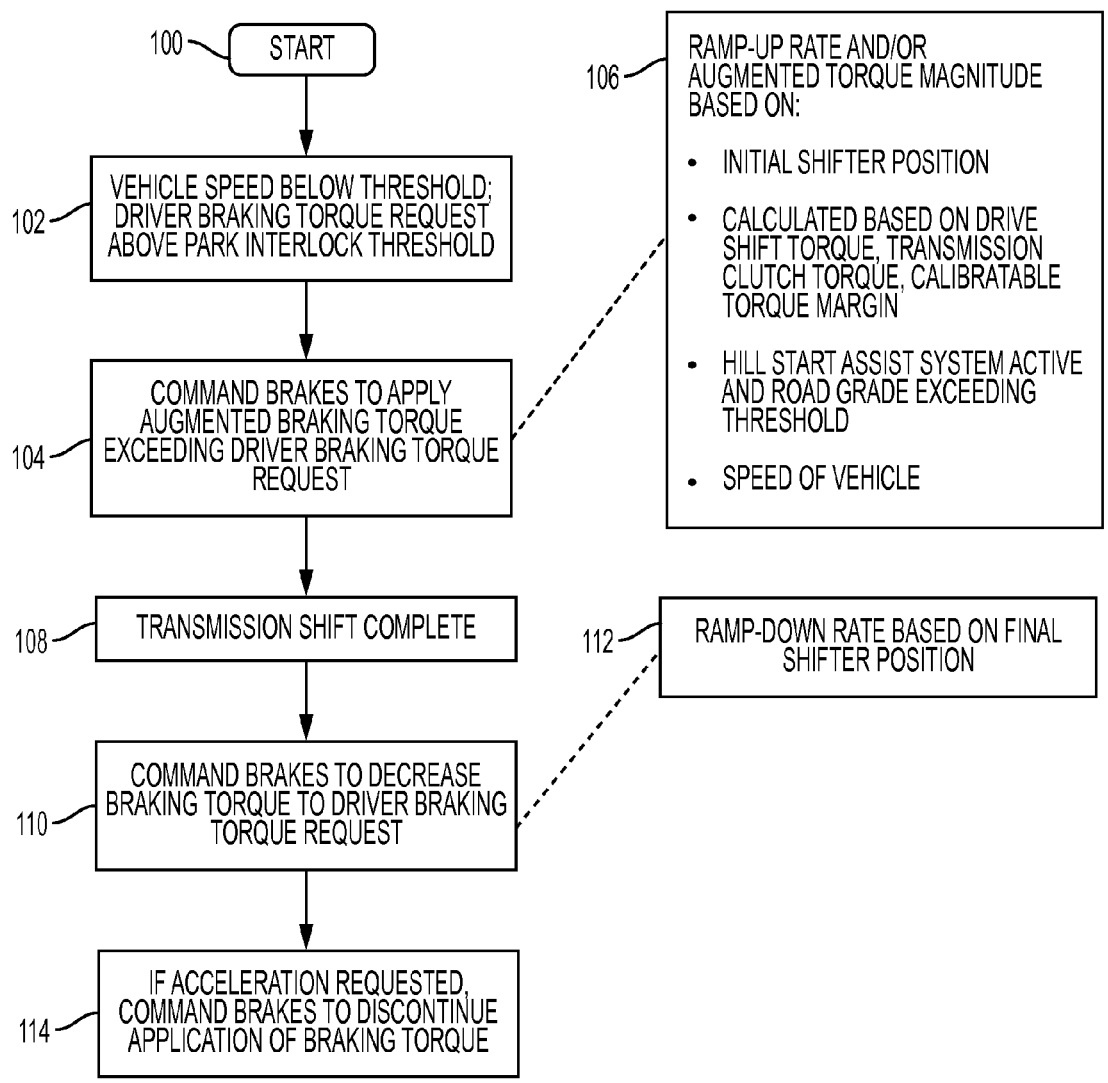
FIG. 4 is a flowchart illustrating a representative method for controlling a vehicle according to an embodiment of the present disclosure.

Referring now to FIG. 4, a method of controlling a braking system according to the present disclosure is illustrated in flowchart form. The method begins at block 100.

As illustrated at block 102, the current vehicle speed is less than a speed threshold and a driver braking torque request exceeds a park interlock threshold.

As illustrated at block 104, the vehicle brakes are commanded to apply an augmented braking torque. The augmented braking torque is greater than the driver braking torque request.

As illustrated at block 106, the magnitude of the augmented braking torque and/or the ramp-up rate from the driver braking torque request to the augmented braking torque may be based on multiple considerations, including but not limited to: an initial shifter position; a calculated braking requirement based on drive shaft torque, transmission clutch torque, and a calibratable torque margin; a hill start assist system being active and a road grade exceeding a calibratable threshold; and a current speed of the vehicle.

As illustrated at block 108, the transmission shift between gears is completed.

As illustrated at block 110, the vehicle brakes are commanded to decrease the applied braking torque from the augmented braking torque to a torque based on the drive braking torque request.

As illustrated at block 112, the ramp-down rate may be based on a final shifter position.

As illustrated at block 114, if acceleration is requested, e.g. by driver application of an accelerator pedal, the brakes are commanded to discontinue application of braking torque. As illustrated at block 116, the method ends.

Variations on the above-described system and method are contemplated within the scope of the present disclosure. For example, methods according to the present disclosure may be implemented in conjunction with partially- or fully-autonomous vehicles. In such vehicles, the automated driving algorithm may be considered a "driver" for purposes of the driver braking and accelerator requests discussed above. Other variations are, of course, possible.

As may be seen, the present disclosure provides systems and methods that may avoid NVH and other undesirable sensations during shifting, thus increasing operator satisfaction. Furthermore, systems and methods according to the present disclosure may provide this advantage without requiring intervention by the vehicle operator.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a vehicle having a braking system configured to provide braking torque to traction wheels and a transmission configured to operate according to a plurality of transmission modes, the method comprising:
in response to vehicle speed being less than a speed threshold and a driver braking request being less than a brake interlock threshold, commanding the braking system to apply a first braking torque to the traction wheels, the first braking torque being equal to the driver braking request;
in response to vehicle speed being less than the speed threshold and the driver braking request exceeding the brake interlock threshold, commanding the braking system to apply a second braking torque to the traction wheels, the second braking torque having a magnitude exceeding the driver braking request; and
in response to the transmission completing a shift from a first mode to a second mode with the second braking torque applied, commanding the braking system to adjust the magnitude of the second braking torque to a level equal to the driver braking request.

2. The method of claim 1, wherein the second braking torque magnitude is based on the first mode of the transmission.

3. The method of claim 1, wherein the first mode is a PARK gear and the second mode is a DRIVE gear.

4. The method of claim 1, wherein the second braking torque magnitude is determined based on a drive shaft torque, a transmission clutch torque, and a preset torque margin.

5. The method of claim 1, wherein commanding the braking system to apply a third braking torque includes reducing braking torque from the second braking torque to the third braking torque at a preset rate based on the second mode of the transmission.

6. A vehicle comprising:
traction wheels;
a braking system configured to provide braking torque to the traction wheels; and
a controller configured to, in response to vehicle speed being less than a speed threshold and a driver braking torque request being greater than a brake interlock threshold, command the braking system to provide an augmented braking torque to the traction wheels, the augmented braking torque being greater than the driver braking torque request.

7. The vehicle of claim 6, further comprising a gear shifter, wherein the augmented braking torque is based on a gear shifter position when the driver braking torque request is received.

8. The vehicle of claim 6, wherein the controller is further configured to, in response to a transmission gear shift being completed with the augmented braking torque applied, command the braking system to adjust the braking torque to a level equal to the braking torque request.

9. The vehicle of claim 8, further comprising a gear shifter, wherein the controller is further configured to command the braking system to reduce braking torque from the augmented braking torque to the braking torque based on the braking torque request at a preset rate based on a final gear shifter position.

10. The vehicle of claim 6, wherein the controller is further configured to, in response to a detected road grade exceeding a preset threshold, command the braking system to provide an augmented braking torque corresponding to the greater of a preset value based on a gear shifter position and a braking torque to hold the vehicle stationary at the detected road grade.

11. A method of controlling a vehicle, comprising:
in response to vehicle speed being less than a speed threshold and a driver braking torque request being greater than a brake interlock threshold, commanding vehicle brakes to provide an augmented braking torque, the augmented braking torque having a magnitude greater than the driver braking torque request.

12. The method of claim 11, wherein the augmented braking torque magnitude is in response to a gear shifter position when the driver braking torque request is received.

13. The method of claim 11, wherein the augmented braking torque magnitude is determined based on a drive shaft torque, a transmission clutch torque, and a preset torque margin.

14. The method of claim 11, further comprising, in response to a transmission gear shift being completed with the augmented braking torque applied, commanding the vehicle brakes to provide a braking torque equal to the braking torque request.

15. The method of claim 14, wherein commanding the vehicle brakes to provide a braking torque based on the braking torque request includes commanding the vehicle brakes to reduce braking torque from the augmented braking torque to the braking torque equal to the braking torque request at a calibratable rate.

16. The method of claim 15, wherein the transmission gear shift is in response to a gear shifter being moved from an initial position to a final position, and wherein the preset rate is based on the final position.

17. The method of claim 14, wherein the commanding the vehicle brakes to provide a braking torque equal to the braking torque request is in further response to the vehicle being stationary.

18. The method of claim 11, wherein a detected road grade exceeds a preset threshold, and the augmented braking torque magnitude corresponds to the greater of a preset value based on a gear shifter position and a braking torque to hold the vehicle stationary at the detected road grade.

19. The method of claim 11, further comprising in response to an acceleration request and the vehicle brakes providing the augmented braking torque, commanding the vehicle brakes to reduce braking torque at a preset rate.

* * * * *